United States Patent [19]
Graves et al.

[11] 3,909,103
[45] Sept. 30, 1975

[54] LENS SCAN MECHANISM
[75] Inventors: Herbert Kenneth Graves, Covina; Andrew Paul Bessette, Hacienda Heights, both of Calif.
[73] Assignee: Xerox Corporation, Stamford, Conn.
[22] Filed: Apr. 18, 1974
[21] Appl. No.: 461,816

[52] U.S. Cl. .................... 350/6; 178/7.6; 350/285; 355/8
[51] Int. Cl.² ......................................... G02B 27/17
[58] Field of Search .............. 350/6, 285; 355/8, 49, 355/57, 58; 178/7.6

[56] References Cited
UNITED STATES PATENTS
2,262,584  11/1941  Herriott .............................. 178/7.6
3,051,044  8/1962  McNaney .............................. 350/6
3,612,679  10/1971  Punnett et al. ....................... 355/8

*Primary Examiner*—Ronald L. Wibert
*Assistant Examiner*—Richard A. Rosenberger
*Attorney, Agent, or Firm*—James J. Ralabate; Terry J. Anderson; Leonard Zalman

[57] ABSTRACT

A lens scan mechanism having a scan rate adjustment member which is pivoted about a fixed point. The adjustment member receives its pivoting motion from a drum cam through a spring loaded cable. By providing lenses of different magnification with an attachment which contacts the pivoted adjustment member at different points, adjustment of the lens scan rate is achieved automatically with changes in lens magnification.

2 Claims, 2 Drawing Figures

LENS SCAN MECHANISM

BACKGROUND OF THE INVENTION

To conserve storage space, document storage in recent years has been in the form of microfilm or microfiche. Such storage is achieved by scanning the document with a light beam and focusing the reflected light at a reduced magnification onto a sheet or strip of photographic film. Due to the non-existence of an industrial standard for magnification, reduction sizes have ranged from 20X to 48X and above.

Due to the different reduction sizes, it is desirable to have an image reproduction machine that can reproduce microform images of different reduction rates on standard size paper and within a desired area of the paper. To achieve such reproduction, the scan rate of the machine must change for each reduction size. For example, microimages having a reduction of 48X must have a slower scan rate than a microimage having a reduction of 20X.

Existing image reproduction machines for reproducing microimages of different reduction rates are generally complex and costly. Generally, these machines use cam surfaces having different shapes to achieve the proper or desired scan rate. Obviously, such surfaces are difficult to produce due to close tolerance requirements. Further, in existing machines the mechanical devices for changing scan rates are located within the machine and not easily accessible for changing.

OBJECTS OF THE INVENTION

It is an object of the present invention to provide an apparatus which will provide different lens scan rates.

It is a further object of the present invention to provide an apparatus that will provide different lens scan rates at reduced cost.

It is a further object of the present invention to provide an apparatus that will automatically change scan rates with a change in the lens magnification of an imaging assembly.

In accordance with the invention, different lens scan rates are provided by a scan system that receives its motion from a drive cam through a flexible cable which is spring loaded against a pivotable scan rate adjustment member or bar. Each magnification lens assembly has a protruding portion which abuts the scan bar. Lenses of different magnification have protrusions which contact the scan bar at different distances from the pivotable point of the scan bar, such that pivoting of the scan bar can produce lens scan rates that are different.

DESCRIPTION OF THE PREFERRED EMBODIMENT

Although the present invention is applicable to any system requiring different lens scan rates, it is particularly useful when a xerographic processor is used to produce hard copy from microform images since the scan rate can be adjusted so that the focused image scans at the same rate as the rate that the circumference of the photoreceptor drum of the xerographic processor is moving. Accordingly, the invention will be described with reference to a xerographic type of microform reproduction apparatus, although it may be used with other types of systems requiring adjustable lens scan rates.

Figure 1:
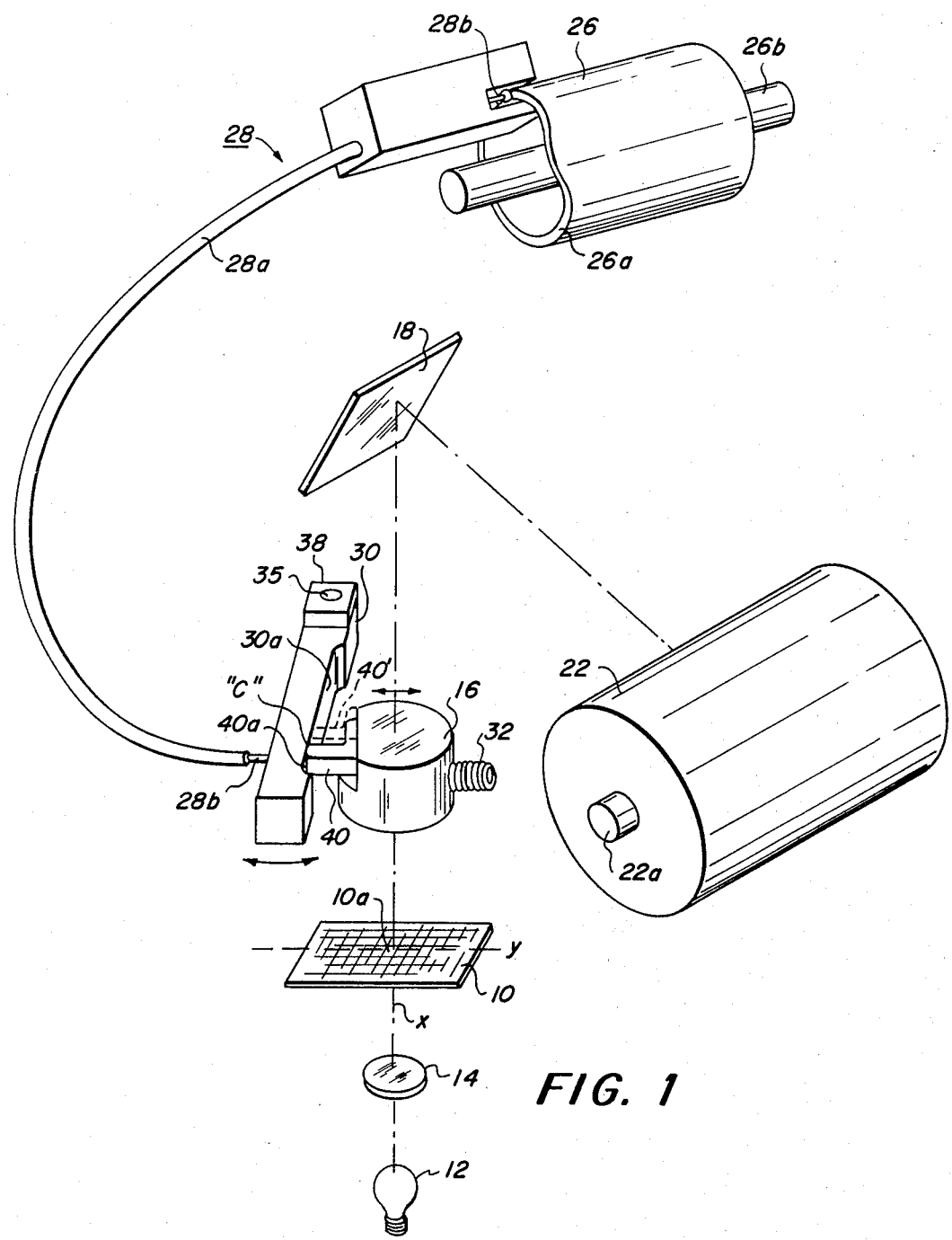
FIG. 1 is an isometric view of the lens scan system of the invention used in a system having a xerographic processor to produce a hard copy of a microform image.

Referring to FIG. 1, a microfiche card 10 having a given reduction rate is positionally adjusted along the indicated X and Y axes of a microimage reproduction apparatus to position a particular frame 10a of the card 10 on the axis of the projection optics of the reproduction apparatus. The projection optics comprises a conventional projection lamp 12, a focus lens 14, a scan projection lens 16, and mirror 18. The image from mirror 18 is projected onto a photoreceptor drum 22 through a slit in a fixed light shield (not shown) positioned adjacent to the photoreceptor drum surface.

The system for scanning the microform image 10a comprises a drum cam 26, a push cable 28 and a pivotal scan rate adjustment member or bar 30. Cable 28 has a fixed outer sleeve 28 and a moveable inner core 28b which is connected to pivotal bar 30 and spring loaded against the sculptured surface 26a of cam 26 by means of a compression spring 32 acting through lens 16 and bar 30. The pivotal bar 30 is mounted to pivot about a pin 35 which extends through a hole in bar 30 and is supported by a stationary member 38.

A lens attachment member 40 is rigidly affixed to scan lens 16. The extremity 40a of member 40 is maintained in contact with a flat surface 30a of pivotal bar 30 by compression spring 32 which, as previously mentioned, also maintains cable 28 against surface 26a of cam 26. Member 40 may be attached to lens 16 by means of mechanical fasteners or may be formed as an integral part of lens 16.

In operation, drum cam 26 is rotated in synchronism with rotation of photoreceptor drum 22, for example, by a chain drive (not shown) coupled between the drive shaft 22a of drum 22 and the drive shaft 26b of cam 26 such that a one-to-one rotation ratio is achieved, that is, drum cam 26 makes one full revolution for each full revolution of photoreceptor drum 22. Rotation of cam 26 transmits a force along cable 28 such that the scan rate pivot bar 30 pivots around pin 35.

Figure 2:
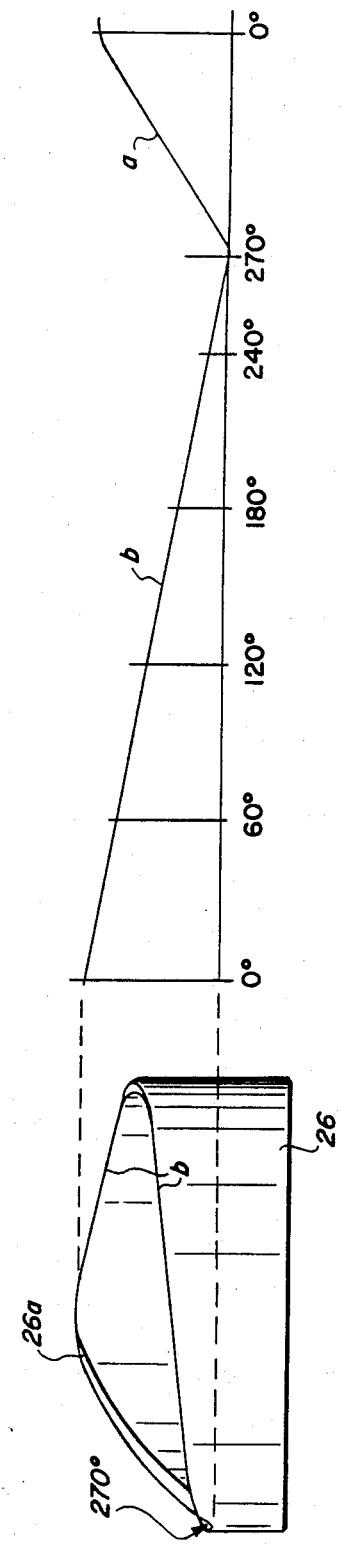
FIG. 2 is an elevation view of a component of the lens scan system of the invention with curves illustrating the shape of that member.

Referring to FIG. 2, assuming a clockwise rotation past a reference point, the longitudinal depth of cam 26 decreases abruptly over a small section $a$ of its circumference and increases linearly over the remaining section $b$ of its circumference. Typically, section a would extend over about 90° of the rotation angle of cam 26 and would have a decline rate of about 0.01 inches per degree of rotation of cam 26, and section b would extend over the remainder of the rotation angle of cam 26 and would have a rise rate of about 0.0033 inches per degree of rotation of cam 26. The dotted line of FIG. 2 shows how the cam 26 would look if it were "unwrapped".

The drives for cam 26 and drum 22 are adjusted such that cam 26 is at the 270° position when drum 22 is at the "start copy" position. At the 270° position, the spring 32 has pushed the lens 16 to its extreme or far left position, which movement also pushes, by virtue of the contact between the members 30 and 40, the free end of bar 30 to its far left position. As the cam 26 rotates in a clockwise direction, the effective height of cam 26 increases and, as a result of the pushing action of cable 28, the free end of bar 30 and the lens 16 move speedily to the right. When the cam 26 has rotated about 270°, the cam has pushed (through the action of cable 28) the free end of the bar 30, and the lens 16, to their extreme right positions. During this movement of lens 16 to the right, the lens 16 progressively focuses light passing through elemental strips of the image of frame 10a onto progressive elemental strips of the photoreceptor drum 22 as defined by the slit in the light shield. After movement of the lens to the far right position, the effective height of cam 26 decreases and the lens 16 moves back to the far left position. Thus, the system is set to rescan frame 10a or scan another frame of the microfiche 10 located in the position of frame 10a.

The scan rate of the scan lens 16 is controlled by the point c at which member 40 contacts the area 30a of the pivot or scan rate adjustment bar 30. The closer the contact point c is to the pivoting point P of the bar 30, the slower the scan rate will be, since, for a given rotation of bar 30, a point closer to the pivot point P will move less than a point more remote from pivot point P. For example, if the frames of the microfiche 10 have a 20X reduction, the contact point c will be set or adjusted to be further from pivot point P than if the frame had a 48X reduction since the greater reduction will require a slower scan rate. That is, a 48X reduction will require a slower scan rate than a 20X reduction if both images are to be focused on the same area of drum 22.

Reproduction of images having different reduction sizes will require that the scan lens 16 have different magnifications. Thus, the lens 16 will be changed for different reduction rates of the frames of the microfiche 10. By positioning the lens attachment member 40 of lens 16 such that it has different contact locations with pivot bar 30 for lenses of different magnification, the scan rate is automatically changed when the scan lens 16 is changed. For example, the member 40 will be located in the position shown (solid line) in FIG. 1 when the frames of microfiche 10 have a magnification of 20X and will be located in the position shown by the dotted line member 40' in FIG. 1 when the frames have a magnification of 48X.

As is apparent, the automatic adjustment of scan rate and magnification will greatly reduce the cost of the scan equipment. Further, control of the scan rate can be achieved easily by the operator of the apparatus since any reproduction system will be designed such that the scan lens can be easily reached for changing. Further, the only close tolerance part of the scan apparatus is the surface 26a of cam drum 26. Hence, there is a minimum of close tolerance requirements on parts of the scan system of the invention.

Various modifications can be made to the scan system within the scope of the invention. For example, instead of being rigidly affixed to the scan lens 16, member 40 could be attached to the scan lens 16 such that it could be slid to a desired contact position with member 30 and then fixed in place to achieve the desired scan rate.

What is claimed is:

1. An apparatus for regulating the scan rate of a lens scan system that may use any one of a plurality of lenses having different magnifications, comprising:

a pivot member mounted for pivotally rotating about a fixed member;

a rotatable member having a surface shaped to provide a desired scanning movement of a selected one of said lenses, lens scan rate adjustment means coupled to said lens and forceably urged against said pivot member, said lens scan adjustment means contacting said pivot member at a first distance from said fixed member when said lens has a first magnification and at a different distance from said pivot point when said lens has a magnification different from said first magnification, and coupling means for transmitting forces from said rotatable member to said pivot member to have said lens move in accordance with the shape of said rotatable member.

2. A method of controlling the scan rate of the lens assembly of a lens scan system that may use any one of a plurality of lenses having different magnifications, said scan system having a pivotally mounted member against which said lens assembly is forceably urged, comprising:

adjusting the point at which said lens assembly abuts said pivotally mounted member, lens assemblies of different magnification abutting said pivotally mounted member at different points, and pivoting said pivotally mounted member to cause said lens assembly to move at the desired scan rate.

* * * * *